United States Patent
Mikolajewski et al.

(10) Patent No.: US 9,567,951 B2
(45) Date of Patent: Feb. 14, 2017

(54) DEVICE FOR TRANSMITTING SOUND

(71) Applicant: Dr. Ing. h.c. F. Porsche Aktiengesellschaft, Stuttgart (DE)

(72) Inventors: Sergej Mikolajewski, Remseck (DE); Thomas Schmid, Schwaikheim (DE); Uwe Langer, Boeblingen (DE); Mark Tiemann, Pforzheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 141 days.

(21) Appl. No.: 14/574,502

(22) Filed: Dec. 18, 2014

(65) Prior Publication Data
US 2015/0176550 A1  Jun. 25, 2015

(30) Foreign Application Priority Data
Dec. 19, 2013 (DE) ........................ 10 2013 114 502

(51) Int. Cl.
| F02M 35/12 | (2006.01) |
| B60Q 5/00 | (2006.01) |
| G10K 15/00 | (2006.01) |
| G10K 11/18 | (2006.01) |

(52) U.S. Cl.
CPC ............ *F02M 35/1294* (2013.01); *B60Q 5/00* (2013.01); *F02M 35/1272* (2013.01); *G10K 11/18* (2013.01); *G10K 15/00* (2013.01)

(58) Field of Classification Search
CPC ............ B60R 11/0217; B60R 13/0815; F02M 35/1294; F02M 35/1238; F02M 35/161
USPC .......... 123/184.57, 184.21, 184.53; 181/175, 181/182, 210
See application file for complete search history.

(56) References Cited

U.S. PATENT DOCUMENTS

| 6,600,408 | B1 | 7/2003 | Walter et al. |
| 8,127,888 | B1* | 3/2012 | Mah ................... F02M 35/1216 123/184.53 |
| 8,177,022 | B2* | 5/2012 | Honji .................... G10K 11/22 181/175 |
| 2004/0094112 | A1 | 5/2004 | Hoffmann et al. |
| 2007/0295553 | A1* | 12/2007 | Ochi ...................... F02M 27/08 181/18 |
| 2010/0263963 | A1* | 10/2010 | Honji .................... G10K 11/22 181/175 |
| 2013/0230185 | A1* | 9/2013 | Osawa .................... B60Q 5/00 381/86 |

FOREIGN PATENT DOCUMENTS

| DE | 19957902 | 6/2001 |
| DE | 102005025092 | 4/2006 |
| DE | 102009057988 | 6/2011 |
| DE | 102010036769 | 2/2012 |
| JP | 2005527863 A | 9/2005 |
| JP | 2008267220 A | 11/2008 |

OTHER PUBLICATIONS

Machine Translation of DE 102009057988, 2011, see "DE1020095988_MachineTranslation.pdf".*

* cited by examiner

*Primary Examiner* — Long T Tran
(74) *Attorney, Agent, or Firm* — Gerald E. Hespos; Michael J. Porco; Matthew T. Hespos

(57) ABSTRACT

A device for transmitting sound has a transmission element shaped to form a sound symposer and forms a sound cone between a rear wall and a front-side panel, Thus, sound is projected from the latter through openings in the panel into the vehicle interior.

8 Claims, 3 Drawing Sheets

DEVICE FOR TRANSMITTING SOUND

CROSS REFERENCE TO RELATED APPLICATION

This application claims priority under 35 USC 119 to German Patent Appl. No. 10 2013 114 502.7 filed on Dec. 19, 2013, the entire disclosure of which is incorporated herein by reference.

BACKGROUND

1. Field of the Invention

The invention relates to a sound transmitting device.

2. Description of the Related Art

U.S. Pat. No. 6,600,408 B1 discloses an apparatus with a hollow body for targeted transmission of sound from an intake tract of an internal combustion engine of a motor vehicle to an interior of the motor vehicle. DE 10 2005 025 092 B3 discloses a device for transmitting sound from an internal combustion engine to a passenger compartment. The device has a plate with a through opening and comprises a membrane surface insulator. Furthermore, DE 10 2010 036 769 A1 discloses a sound symposer for transmitting noises in a vehicle from the intake tract of an internal combustion engine into a vehicle interior is known from.

It is an object of the invention to provide a device for transmitting sound from an internal combustion engine to a vehicle interior while ensuring a targeted projection of sound prepared for the vehicle interior.

SUMMARY OF THE INVENTION

The invention enables sound energy to be conducted by the device from the internal combustion engine to the vehicle interior in a desired manner. For this purpose, the invention provides a transmission element with a closed rear wall and a front-side panel with a multiplicity of sound passage openings. A sound cone is formed between the rear wall and the panel. The sound cone of the device enables sound projected from the internal combustion engine to be conducted into the vehicle interior in a targeted manner.

The rear wall may be spaced apart from the panel. A lower sound inlet opening may be provided between the panel and the rear wall and the sound outlet openings are provided in the panel. Thus, the sound entering the sound cone can be conducted through the sound outlet openings to the vehicle interior in a targeted manner.

The transmission element may be inserted in a cutout in the carpet and may be fixed in the cutout by hook elements and fixing elements. The front-side panel overlaps the rear wall with a protruding peripheral edge that covers the cutout in the carpet. This arrangement of the panel enables optimal visual covering of the cutout in the carpet.

The transmission element is fastened via fixing elements that lie next to one another in parallel in the region of the upper rear wall of the transmission element and protrude away from the rear wall. Fixing points are arranged on the fixing elements. At least two downwardly extending, free-standing hook elements may be arranged in the region of the lower rear wall of the transmission element, and the transmission element may be held clamped in the cutout by the element and by the peripheral edge of the panel.

Sound from the internal combustion engine can be conducted via a body opening to the transmission element. In addition, a tunnel can be formed on the lower side of the carpet covering in a foam covering on application to the body shell. The tunnel also conducts sound from the sound symposer into the vehicle interior.

DETAILED DESCRIPTION

Figure 1:
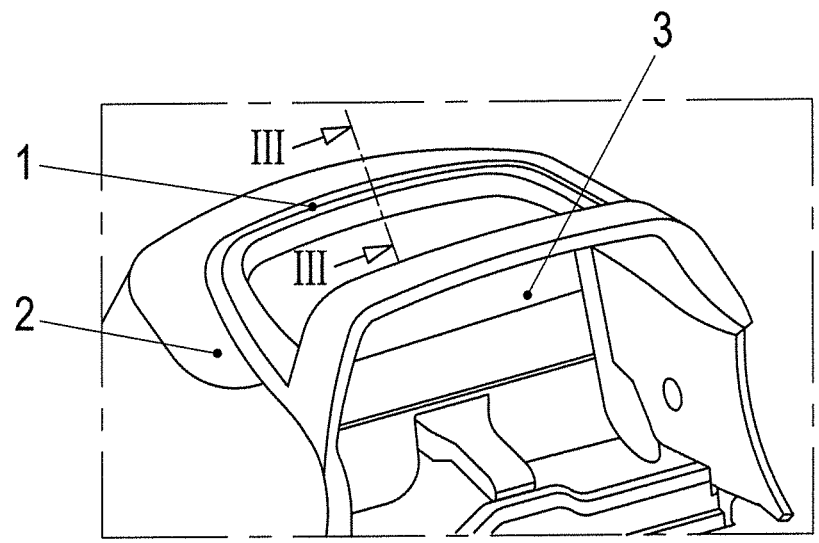
FIG. 1 is a perspective view of a vehicle rear with the arrangement of the device for transmitting sound.
Figure 2:
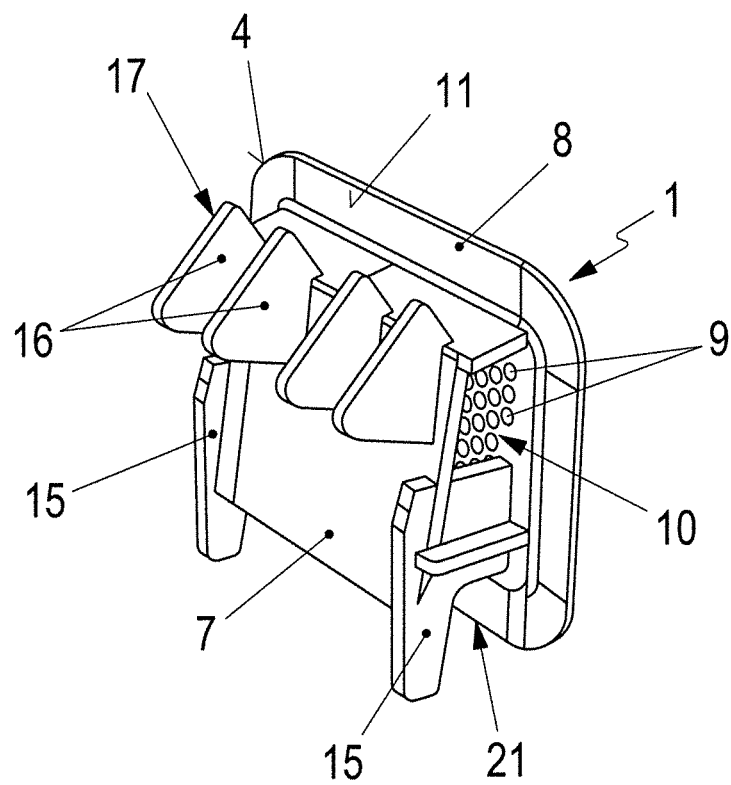
FIG. 2 is a perspective view of the device having a panel with an integrated sound cone.
Figure 3:
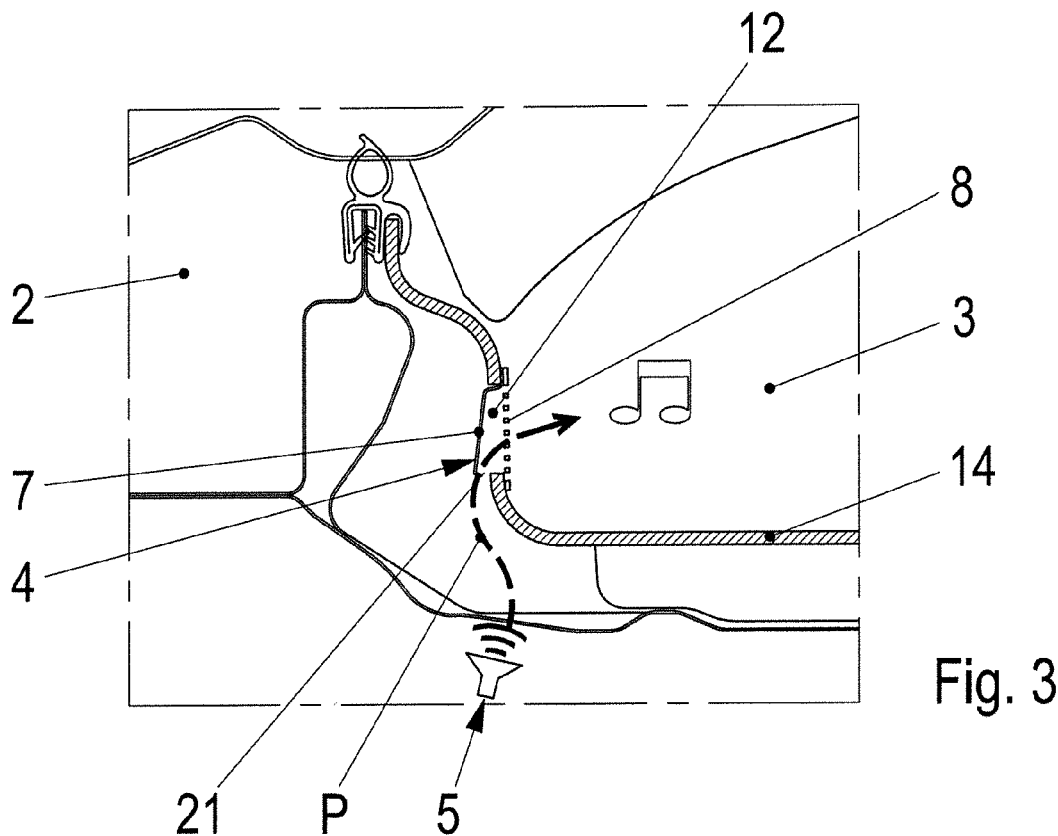
FIG. 3 is a cross-sectional view taken along line III-III of FIG. 1.

A device 1 for transmitting sound from an internal combustion engine is arranged in an internal combustion engine compartment in the rear of a motor vehicle or from an intake tract of the internal combustion engine of a motor vehicle 2 to an interior 3 of the vehicle 2. The device 1 comprises a sound transmission element 4 that is shaped on the inlet side to form a sound symposer 5 and on the outlet side permits a projection of sound to the vehicle interior 3 as illustrated by an arrow P in FIGS. 3 and 4.

The transmission element 4 has a closed rear wall 7 and a front panel 8 that is provided with a multiplicity of small openings 9 in the entire surface for the passage of sound. A sound cone 10 is formed between the rear wall 7 and the panel 8.

The front panel 8 protrudes over the rear wall 7 with an edge 11 that protrudes peripherally over the rear wall 7 and completely covers the cutout of the opening 12 in the carpet covering 14.

The transmission element 4 is held inserted in the cutout 12 in the carpet 14 and is fixed in the cutout 12 by hook elements 15 and fixing elements 16.

The fixing elements 16 lie next to one another in parallel and protrude away from the rear wall 7 and have upwardly projecting fixing points 17 arranged in the region of the upper rear wall of the transmission element 4. The transmission device 4 is held clamped in the cutout 12 in the carpet covering 14 between the fixing points 17 and the edge 11 of the panel 8.

At least two downwardly extending, free-standing hook elements 15 are arranged in the region of the lower rear wall 7 of the transmission element 4, and the lower section of the transmission element 4 is clamped in the cutout 12 in the carpet covering 14 between the hook elements 15 and the edge 11 of the rear wall 7.

Figure 4:
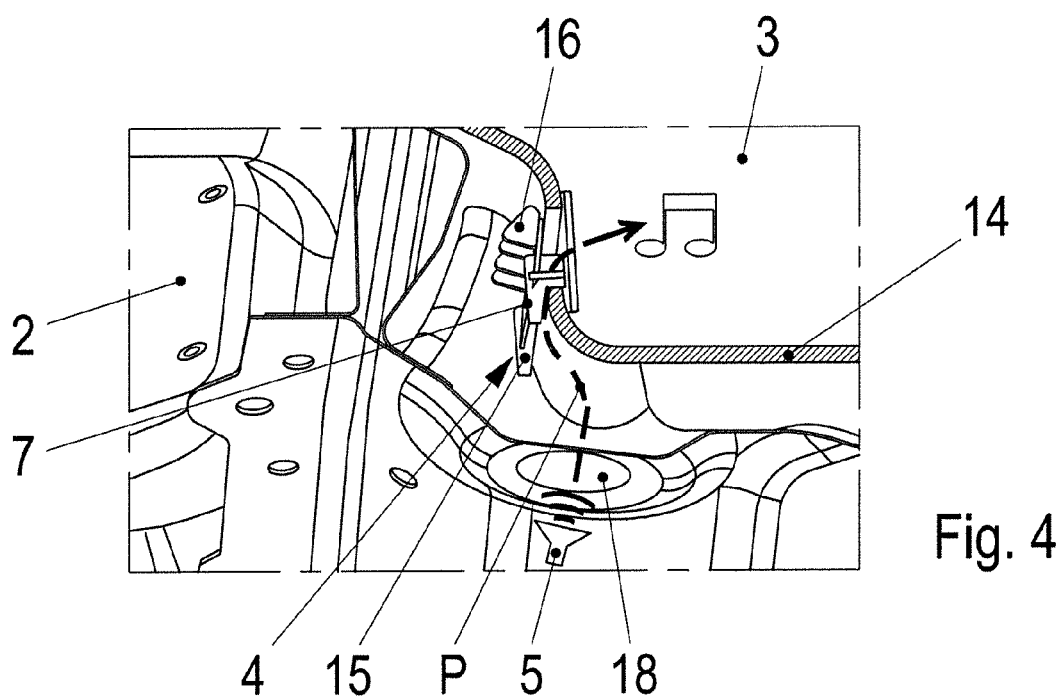
FIG. 4 is a perspective view of the transmission element with the fixing elements and hooks.

As FIG. 4 shows in more detail, the sound can be conducted by the sound symposer 5 from the internal combustion engine compartment via a body opening 18 to the sound transmission element 4 and can be supplied from the sound transmission element 4 to the interior 3 of the vehicle 2.

Figure 5:
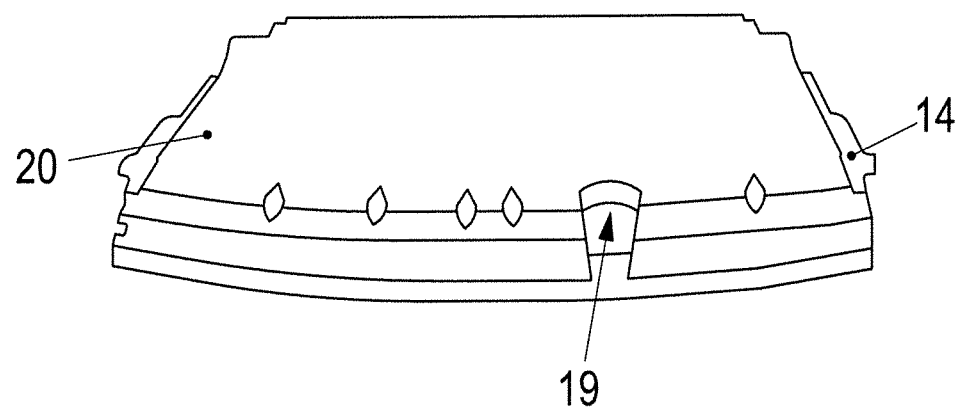
FIG. 5 is a schematic illustration of a tunnel in a foam element below the carpet.

On application to the body shell of the vehicle 2, a foam recess in the lower side of the carpet covering 14 forms a tunnel 19 that conducts sound from the sound symposer 5 into the interior 3 of the vehicle 2, as is illustrated in more detail in FIG. 5.

What is claimed is:

1. A device for transmitting sound from an internal combustion engine of a motor vehicle, through a cutout and to an interior of the motor vehicle, comprising: a sound transmission element having an inlet side defining a sound symposer and an outlet side that conducts sound to the vehicle interior, the transmission element having a closed rear wall, a front-side panel provided with a multiplicity of sound passage openings, a sound cone formed between the rear wall and the panel and passing through the cutout, a protruding edge projecting out from an outer periphery of the panel and completely covering a periphery of the cutout from the interior of the motor vehicle, hooks projecting out from a first side the transmission element and spaced rearward from the protruding edge, a plurality of parallel planar fixing elements projecting from a second side of the transmission element opposite the hooks and having fixing points projecting away from the hooks, the fixing points and the hooks engaging surface areas adjacent the cutout.

2. The device of claim 1, wherein the rear wall is spaced apart from the panel, and at least one lower sound inlet opening is provided between the panel and the rear wall, the sound passage openings being provided over an entire surface in the panel.

3. The device of claim 1, wherein the transmission element is held inserted in the cutout in a carpet covering and is fixable in the cutout by hooks and fixing elements.

4. The device of claim 3, wherein the front panel overlaps the rear wall peripherally with the protruding edge, the protruding edge completely covering the cutout in the carpet covering.

5. The device of claim 3, wherein the fixing elements are next to one another and protrude away from the rear wall, the fixing points in an upper region of the rear wall of the transmission element engage the carpet covering adjacent the cutout.

6. The device of claim 5, wherein the hooks are arranged in a lower region of the rear wall of the transmission element.

7. The device of claim 1, wherein the sound from the internal combustion engine is supplied via the sound symposer through a body opening to the transmission element and subsequently to the interior of the vehicle.

8. The device of claim 1, further comprising: a foam element provided on a body shell part, a carpet covering on the foam element and having the cutout communicating with the vehicle interior, and a tunnel being formed between the foam element and the body shell part of the vehicle to transmit the sound into the vehicle interior.

* * * * *